Dec. 12, 1950 L. LACHATRE 2,534,035
SPRING NUT LOCK
Filed July 23, 1947 3 Sheets-Sheet 1
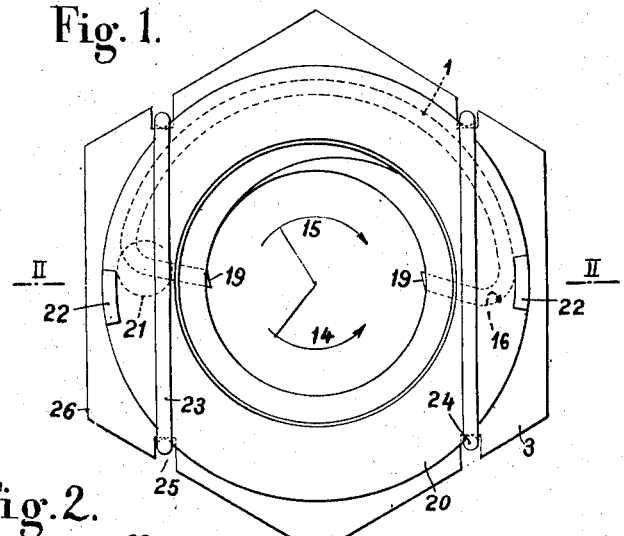
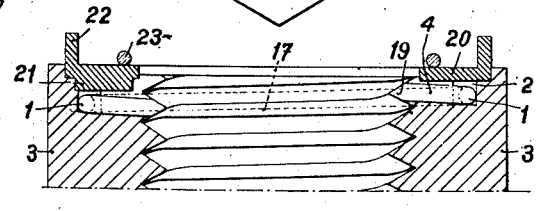
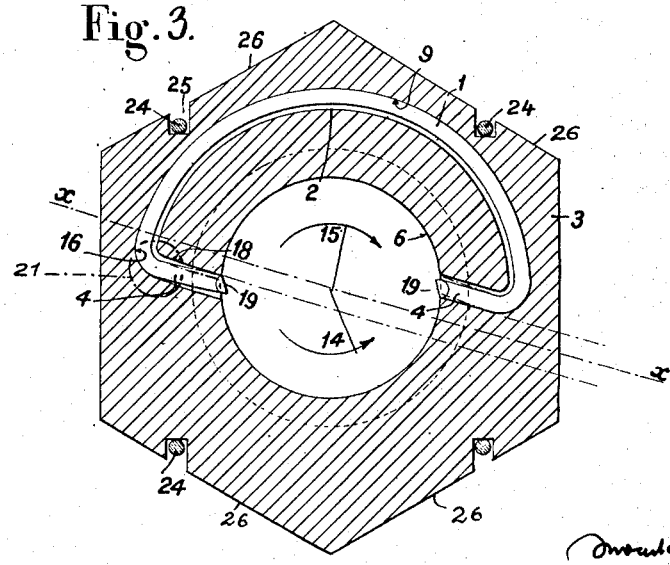

Dec. 12, 1950 L. LACHATRE 2,534,035
SPRING NUT LOCK
Filed July 23, 1947 3 Sheets-Sheet 2

Dec. 12, 1950     L. LACHATRE     2,534,035
SPRING NUT LOCK

Filed July 23, 1947     3 Sheets-Sheet 3

Patented Dec. 12, 1950

2,534,035

UNITED STATES PATENT OFFICE 2,534,035

SPRING NUT LOCK

Louis Lachatre, La Ferte-Alais, France

Application July 23, 1947, Serial No. 762,918
In France December 1, 1943

Section 1, Public Law 690, August 8, 1946
Patent expires December 1, 1963

6 Claims. (Cl. 151—25)

The present invention concerns safety nuts, that is, nuts that cannot work loose although it is possible to unscrew them with the aid of usually employed means.

The purpose of the invention is to create a device which is simple and efficient in design to preclude accidental loosening of nuts.

The device of the invention is of the type comprising an arcuate spring received in a recess in the upper portion of the nut and whose bent-in ends provide points that conform to the shape of the thread on the bolt into which they project, the play available for the points in their housing being such that a path is imposed upon them which is represented by an arc of a circle that is secant to the circumference in the bottom of the thread, so that the points will yield to the tightening action whereas they will resist a loosening action in the reverse direction by wedging themselves in the bottom of the groove, the spring then finding a rest on the wall of its housing.

In order that the principle of the invention may be understood more easily the latter will be described in detail with reference to the drawing appended by way of example showing several embodiments and in which:

Figures 1, 2 and 3 illustrate a first embodiment. Fig. 1 is plan view of the nut provided with a cover secured by clips; Fig. 2 is a vertical section taken on line II—II in Fig. 1; Fig. 3 is a diagrammatical section taken in a plane through the spring.

Figures 4, 5 and 6 show a second embodiment: Fig. 4 is a vertical section of the nut and clip-retained cover before the clips are closed; Fig. 5 is a similar view, yet after the clips are closed; Fig. 6 is a corresponding side elevational view partly in section.

Fig. 8 is a plan view of the nut provided with its cover; Fig. 9 is a vertical section taken on line IX—IX in Fig. 8.

Similar elements are designated by the same reference numerals in all the figures of the drawing.

Figure 4:
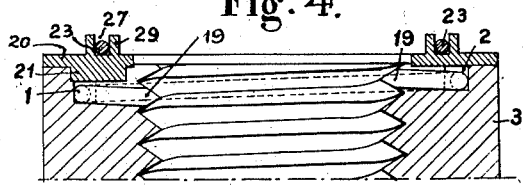

Hollowed out in the upper face of the nut 3 of the first embodiment (Figs. 1 to 3) is a substantially arcuate housing 2 communicating at its ends with two cuts 18 (Fig. 3) which are directed towards the centre of the nut and which intersect the thread circumference 5 at the angle which is thought to be most favorable to the spring action. Said cuts, in the embodiment considered as the one preferable, run parallel to each other and are offset at either side of a common diametrical plane $x$—$x$.

Received in said housing 2 is the spring 1 which is made of round wire (in order that the torsional stresses to which it may be subjected may not alter its shape as it would be if its section were flat). In plan view its general shape is semi-circular (as the one best conforming to the general shape of nuts). It ends in a pair of bent-in legs 4 whose extremities 19 fit in the bolt thread grooves at two diametrically opposite points. The depth of the housing 2 is so determined that the points 19 are in register with the grooves in which same are to be received, the bottom 17 of the housing 2 follows the general slope of the thread.

The points 19 are beveled parallel with the thread, the planes of the bevels being slightly sloped in the screwing direction of the nut so that a nose is obtained which is not easily damageable and which will aid to engagement in the unscrewing direction and to disengagement in the screwing direction. With a metric pitch the angle intersected by the two bevels will preferably be of 60°.

The bent-in ends 4 of the spring (and in fact the whole spring) are received with a certain play in the cuts 18, said play being exactly dimensioned for satisfactory performance of the points.

In their action to resist any risk of loosening (the direction shown by the arrow 15 in Fig. 3 which indicates with reference to the nut the direction of rotation of the bolt in the movement of unscrewing), the points 19 find a bearing on those faces of the cuts 18 which are closer to the diametrical plane $x$—$x$ whereas their opposite faces enable yet limit their motion of complete disengagement when a screwing action is performed (the direction shown by the arrow 14).

The points are presented to the circumference 5 of the thread at the same angle of incidence.

The peripheral face 9 of the arcuate portion of the housing 2 serves as a rest for the spring 1 and retains it against backward motion.

Briefly stated, it can be said that the housing 2 limits the displacements of the spring in its own plane, retains it from moving backwards and from slipping laterally, enables the points to retract completely at tightening and compel them to penetrate down to the bottom of the thread at unscrewing.

The housing 2 is closed at the top by a cover 20 (Figs. 1 and 2) whose purpose is not only to conceal the spring and remove it from mud, rust and dust but also to keep it in optimum position in the housing 2 while providing for just as much play as is necessary for satisfactory performance. With this end in view the cover is formed on its lower face with a boss 21 that engages the spring 1 at the bend 16 which is located at the deepest portion of the housing 2. At the other end of the spring it is the cover itself which performs the same function for the less deeply housed portion of the spring.

Briefly stated, the cover 20 protects and guides the spring 1, compelling its points 19 to fit into the thread groove without it being necessary to act differently than screwing the nut just the same as an ordinary one.

The cover 20 is fitted in the nut 3 in order that it may not interfere with the use of monkey-wrenches or the like. Preferably, it is formed with one or two lug-like studs 22 in order that it can be taken hold of easily with one's fingers or with pliers.

The cover 20 is held in position by means of a pair of stainless metal clips 23 shaped as an inverted U whose intermediate portion lies flat on the top of the cover while its two vertically projecting legs 24 are received in grooves 25 cut in the faces 26 of the nut 3, the bent-in ends (not shown) of said legs being received and retained in recesses provided in the bottom face of the nut.

The purpose of these clips is to retain the cover in spite of the jerks and vibrations and to make the device inviolable. Consequently, when it is desired to unscrew the nut, it will be necessary first of all to shear the clips at an exposed place thereof, that is, above the cover, to make it possible to remove the latter and the spring 1.

The operation of the device can now be understood easily:

The nut 3 provided with its spring 1, its cover 20 and its clips 23 is engaged on the threads of the bolt. As the nut is screwed a moment comes when the beginning of the thread is engaged by the lower point 19 of the spring 1. Since said point is retained by the boss 21 on the cover 20 it cannot escape and must enter the groove. As the screwing action is continued the other point 19 retained by the cover 20 will in its turn engage into the groove. Said points 19, which engage the groove although remaining clear therefrom, will yield to the screwing action and not resist the same (dotted lines in Fig. 3).

However, if a loosening motion occurs, designedly or not, once the points 19 are engaged in the groove, they will be urged down to the bottom of the groove by the shape and resiliency of the spring due to the fact that they cannot move back beyond the limits of their housing 9—18 and thus will positively lock the nut against any tendency to work loose.

It is to be noted that once the points are fixed, that is, have entered the groove, the spring 1 dampens the vibrations which thus have no action upon the points.

Figs. 4 to 7 show cover securing arrangements whose function in the subject-matter of the invention is not only passive—the protection of the spring—but also active since it keeps the spring exactly positioned in its housing while providing it with just the amount of play necessary for its functioning.

In some instances the securing arrangement by means of a pair of U-shaped clips whose intermediate portion rests on the top of the cover and whose depending legs are bent-in at their ends to catch the bottom of the nut has proved to be subject to criticism. Effectively, by cutting the nut at the place where said clips are laid it will be seen that the section encompassed thereby is square in shape and that as a consequence they cannot well conform to such a section however tightly they may be clamped.

The purpose of the arrangement described hereinafter is to obviate these difficulties due to the fact that the cover is retained by the insetting either of the aforesaid pair of clips on the cover in order to make them rigid with the same or directly of the edge of the cover on the body of the nut.

Visible at 3 (Figs. 4 to 6) is the body of the nut, at 2 the housing for the spring 1 whose points 19 resist the unscrewing of the nut, finally at 20 the cover that closes the housing 2 and that is formed with a boss 21 which bears against the spring 1 to limit its play, said cover being fitted in the top face of the nut 3.

Figure 5:
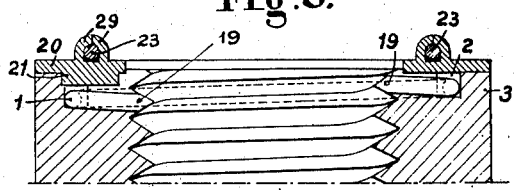
Figure 6:
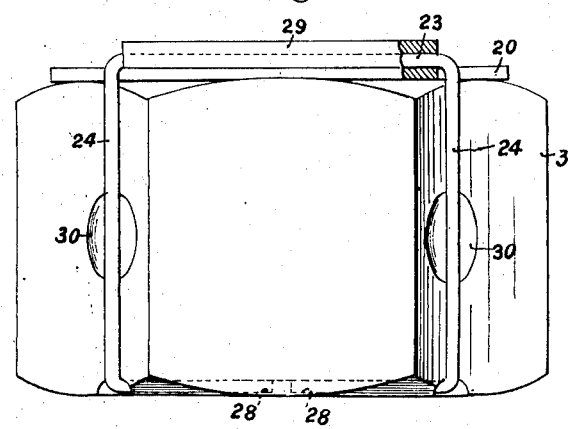

In the example illustrated in Figs. 4 to 6 the cover 20 is held in position by a pair of inverted U-shaped clips 23 whose intermediate portions rest in the bottoms of channels 27 formed by stamping or otherwise on the top face of the cover. The depending legs 24 of the clips 23 are pressed on the sides of the nut 3 and their bent-in ends 28 are received in notches cut in the bottom face of the nut (Fig. 6), the clips thus laid encompassing the nut body almost completely.

The clip thus laid is made rigid with the cover by insetting, which prevents it from being deformed by the clamping action of the clip.

For that purpose the two upstanding sides 29 of the channels 27 are closed together by pressing, thus insetting the clip 23 which at this place secures the cover 20 reliably while improving its stiffness (Fig. 5).

For loosening of the nut the clips 23 are sheared at the place of their legs 24 instead of their top portions. Notches 30 are cut in the metal of the nut 3 to permit of the shearing of the clips at the said places with the aid of a chisel or cutting pliers.

In order to improve the adhesion of the clip on the cover the clip 23 may be knurled over its inset portion, which moreover has for its purpose to prevent the user from using again the cover once it has been removed. Effectively, this operation must be carried out by the manufacturer himself under his warrant.

Figure 7:
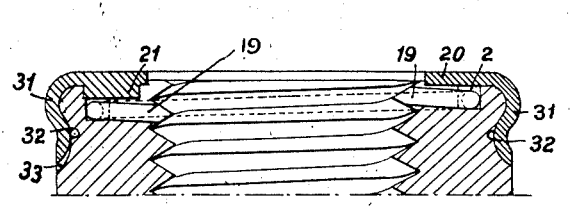
Figure 7 is a vertical section of a third embodiment showing the nut with its cover bent-in at the edges thereof.

In the modification illustrated in Fig. 7 the cover 20 is formed with a castellated edge 31 in the fashion of caps for mineral water bottles, while an annular groove 32 with rounded edges is provided in the upper portion of the body of the nut 3.

The castellated edge 31 of the cover, which is suitably dimensioned for its fitting is inset in the groove 32.

A few notches 33 are provided here and there in the groove 32 in order that a tool point can be inserted under the inset edges to pry the cover out of the groove when the nut is to be removed. The said tool will press on the cover and should deform it to put it out of use.

In the two retaining arrangements described above the cover consequently is secured by direct or indirect insetting, which precludes any risk of play in operation and which thereby prevents the spring from getting excessively loose.

Figure 8:
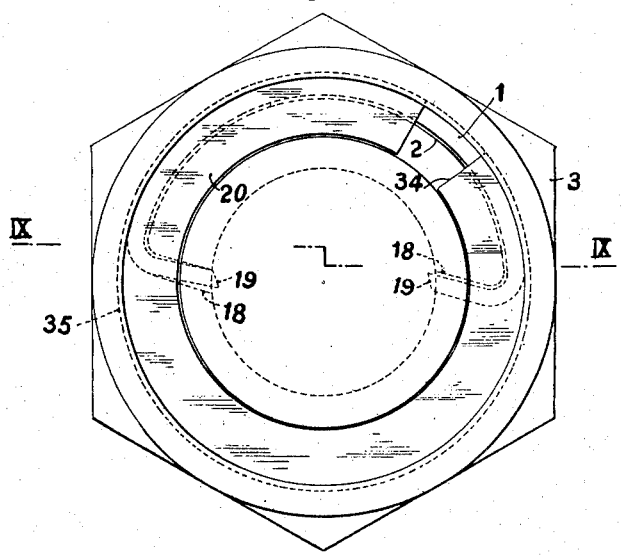
Figures 8 and 9 illustrate a fourth embodiment.
Figure 9:
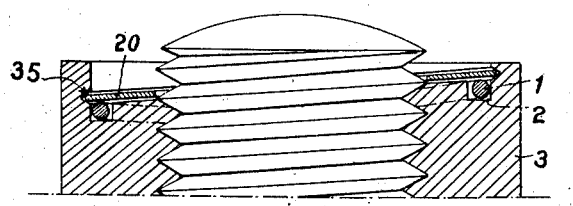

Figures 8 and 9 illustrate improvements in the cover which are intended not only to protect the spring but also to keep it exactly in position in its housing while providing for just the amount of play necessary for its function. This arrangement is characterized thereby that the cover is constituted by a spring steel washer retained in position by an annular groove of the same pitch as the thread and in which it is engaged immediately above the housing for the locking spring.

Said washer is splitted so that it can be disengaged from the groove to permit of the removal of the spring and the quality of the spring steel together with the split confer upon the washer the resiliency which enables it to dampen the vibrations and to be forced out of the groove by the action of any suitable tool, e. g. a point, only for its removal.

A further feature of the improvements providing the subject-matter of the present invention is the fact that the housing of the locking spring is given a circular outline over the whole extent of its circumference and of the top surface of the nut, the purpose of this being to facilitate the obtainment of these provisions by turning on the lathe while resorting as little as possible to milling which is costly and involves the use of easily breakable tools. Only the housings of the legs of the locking spring are milled and thus the groove in which the locking nut is accommodated is only used over one half of its extent.

Visible at 3 is the nut body, at 2 the housing for the spring 1 whose points 19 resist the loosening of the nut and finally at 20 the cover that closes the housing 2, which cover is a washer which acts as a spring owing to its resiliency and to its slit 34. Said washer 20 is received in a groove 35 provided in the body of the nut 3 in accordance with the pitch of the thread and it is reliably retained therein owing to its resiliency. In order to loosen the nut it is thus only necessary to remove the washer 20 from the groove 35 by means of any suitable tool, e. g. a point, which is quite easy due to the provision of the slit 34.

The second feature is the fact that the housing 2 of the locking spring 1 is given a circular outline over the whole extent of its circumference and that only the grooves 18 that serve to accommodate the bent-in ends 19 of the spring 1 are milled out.

In this manner the obtainment of these provisions by turning on the lathe is facilitated and milling is resorted to as little as possible since it is a costly operation which involves the use of delicate tools. It will thus be remarked that the groove 2 which accommodates the spring 1 is used only over one half of its extent, the whole being closed at the top by the spring washer 20 which thus dampens the vibrations, protects the spring 1 and keeps it reliably in position. Finally, this new closing means for the spring housing follows the slope of the thread and thereby keeps the spring strictly in its position.

I claim:

1. A self locking nut adapted to cooperate with threaded rods comprising a nut provided on its upper face with a channel having a middle portion extending circumferentially over substantially 180° around the central bore of the nut and two extreme portions directed substantially radially and opening in said central bore, a spring locking member contained in said channel and having a middle portion bearing on the external face of the middle portion of said channel and two extreme portions extending with a slight clearance in the extreme portions of said channel and bearing normally on the faces of said extreme portions of the channel directed towards the direction of screwing of the nut, said extreme portions of the locking member being each terminated by a bevelled end protruding in the central bore of the nut when said extreme portions of the spring locking member bear against said faces of the extreme portions of the channel directed in the direction of screwing of the nut, said bevelled ends being adapted to be retracted into said channel when frictionally engaged by the threaded rod during screwing of the nut and to grip said threaded rod when said nut is urged in the unscrewing direction, and a cover removably secured on said nut and covering said channel at least in its middle portion and maintaining the spring locking member in said middle portion of the channel without substantial clearance.

2. A self locking nut adapted to cooperate with threaded rods comprising a nut provided on its upper face with a circular recess about the central bore of the nut and in the bottom of said recess with a channel having a middle portion extending circumferentially over substantially 180° around the central bore of the nut and two extreme portions directed substantially radially and opening in said central bore, a spring locking member contained in said channel and having a middle portion bearing on the external face of the middle portion of said channel and two extreme portions extending with a slight clearance in the extreme portions of said channel and bearing normally on the faces of said extreme portions of the channel directed towards the direction of screwing of the nut, said extreme portions of the locking member being each terminated by a bevelled and protruding in the central bore of the nut when said extreme portions of the spring locking member bear against said faces of the extreme portions of the channel directed in the direction of screwing of the nut, said bevelled ends being adapted to be retracted into said channel when frictionally engaged by the threaded rod during screwing of the nut and to grip said threaded rod when said nut is urged in the unscrewing direction, and a split washer having its outer edge engaged in a circular groove formed in the lateral face of said circular recess and covering said channel at least on its middle portion so as to maintain the spring locking member in said middle portion of the channel without substantial clearance.

3. A self locking nut according to claim 10, further comprising U-shaped clips laid on said cover and anchored on the body of the nut.

4. A self locking nut according to claim 10, in which grooves parallel to the axis of the nut are provided in the lateral faces of the nut, and recesses are provided in the lower faces of the nut opposite said grooves in the lateral faces, said nut comprising further U-shaped clips, each of which bearing with its intermediate portion on the top of the cover and having its other portions inserted in two grooves in the lateral faces and in two corresponding recesses in the lower face of the nut.

5. A self locking nut according to claim 10 further comprising channels formed on the outside of the cover, and U-shaped clips resting in said channels and encompassing the nut body.

6. A self locking nut according to claim 10, in which said nut is provided with an annular groove formed in the lateral faces of the nut and extending substantially in parallel relation with the upper and lower faces of the nut, and said cover is provided with a depending flange inserted in said annular groove.

LOUIS LACHATRE.

REFERENCES CITED

The following references are of record in the file of this patent:

UNITED STATES PATENTS

| Number | Name | Date |
| --- | --- | --- |
| 224,630 | Beach | Feb. 17, 1880 |
| 888,797 | Frew | May 26, 1908 |
| 1,076,674 | Jacobs | Oct. 28, 1913 |
| 1,305,729 | McGrath | June 3, 1919 |